United States Patent [19]
Kiyonaga

[11] Patent Number: 5,561,284
[45] Date of Patent: Oct. 1, 1996

[54] APPARATUS AND METHOD FOR READING FILM INFORMATION FOR CARTRIDGE

[75] Inventor: Yutaka Kiyonaga, Wakayama, Japan

[73] Assignee: Noritsu Koki Co., Ltd., Wakayama, Japan

[21] Appl. No.: 412,572

[22] Filed: Mar. 29, 1995

[30]     Foreign Application Priority Data

Apr. 5, 1994 [JP] Japan .................................. 6-067447

[51] Int. Cl.⁶ ...................................................... G06F 7/10
[52] U.S. Cl. .......................... 235/462; 235/464; 235/470
[58] Field of Search .................................. 235/462, 464, 235/470

[56]             References Cited

U.S. PATENT DOCUMENTS 4,963,718  10/1990  Hoshizaki et al. ...................... 235/462
5,109,241   4/1992  Keeney .

FOREIGN PATENT DOCUMENTS

0576220A2  12/1993  European Pat. Off. .

*Primary Examiner*—Harold Pitts
*Attorney, Agent, or Firm*—Armstrong, Westerman, Hattori, McLeland & Naughton

[57]                ABSTRACT

A apparatus for reading film information provided in plural stages on an outer surface of a cartridge containing a film. The apparatus comprises a light source; a pocket including a main body having a space for containing the cartridge in the main body and a window for exposing the film information of the cartridge contained in the space to outside, and a support unit for movably supporting the main body in a direction of varying the stages of the film information; an actuator for moving the main body of the pocket; and a reading mechanism for detecting light emitted from the light source, and reflected at an area of the film information through the window. The film information such as bar codes provided in two or more stages on the outer surface of the cartridge can be automatically read by one sensor, so that labor saving and downsizing of the apparatus can be achieved.

7 Claims, 11 Drawing Sheets

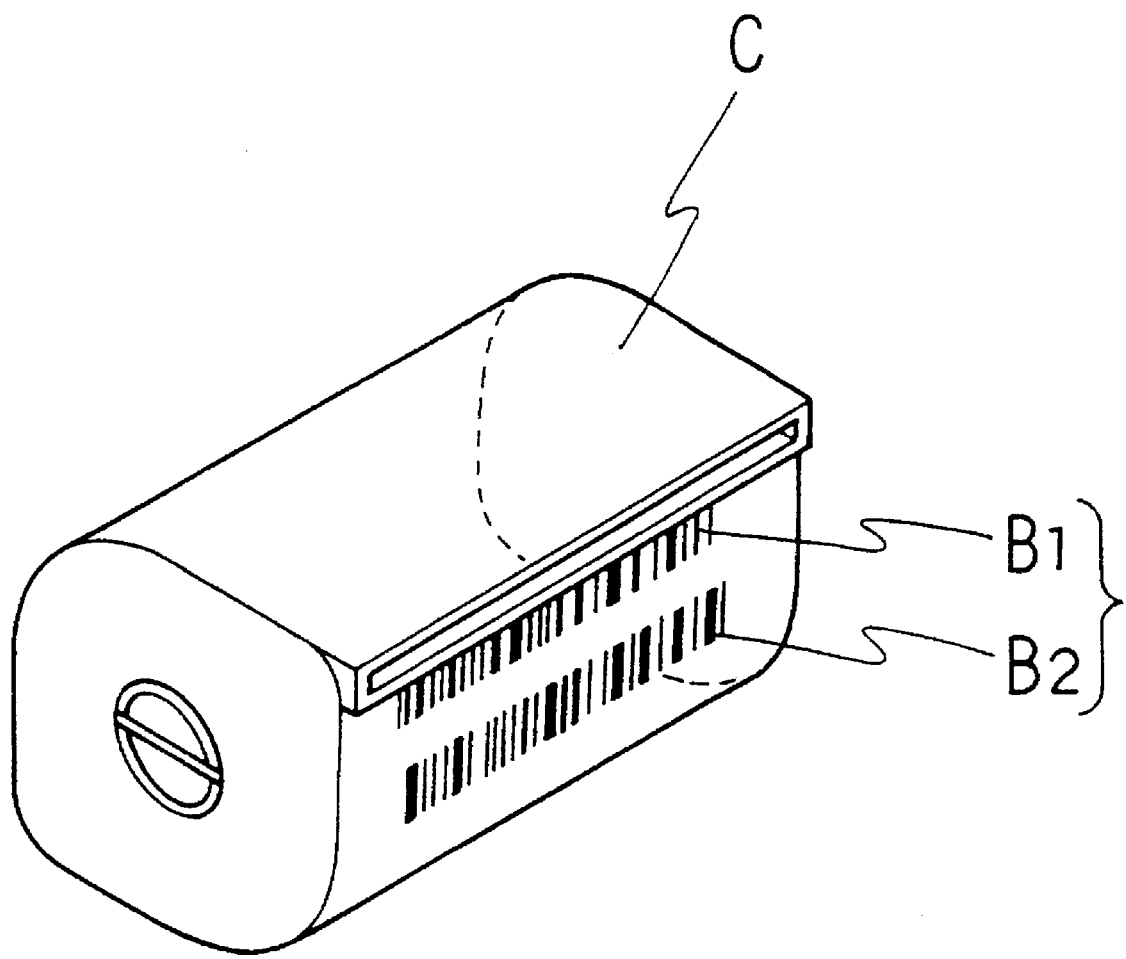

APPARATUS AND METHOD FOR READING FILM INFORMATION FOR CARTRIDGE

BACKGROUND OF THE INVENTION

The present invention relates to an apparatus for reading film information for cartridge, and a method for the same. More particularly, it relates to a reading apparatus and reading method capable of reading film information of each stage automatically by one sensor, when film information such as film ID number and type of film provided in two or more stages on the outer surface of a cartridge in a form of bar code or the like.

Film information such as bar code is utilized in order to know the film information such as ID number, type and number of exposures of the film contained in a cartridge from outside the cartridge.

For example, as shown in FIG. 13, on the outer surface of an approximately cylindrical cartridge C, a bar code B1 indicating the ID number of the film, and a bar code B2 indicating the type of film, number of exposures, and other necessary date ( for example, film maker, production lot) are provided. When the sum of length of these two bar codes B1 and B2 is longer than the axial length of the cartridge C, the bar codes B1 and B2 are divided and provided in two or more stages.

When reading the bar codes B1 and B2 divided in two stages, two methods are known, one using one CCD sensor and the other using plural CCD sensors. In the former case, first of all, the bar code B1 is read by the CCD sensor, and the angle of the cartridge is adjusted by hand to place the bar code B2 before the CCD sensor, and the bar code B2 is read. In the latter case, on the other hand, the bar codes B1 and B2 are placed before the plural CCD sensors, and are read simultaneously.

The former method of using one CCD sensor requires manual adjustment of the cartridge angle, which takes time and labor. Besides, since the bar code is manually placed at specified detecting position, the bar code position is likely to deviate, and reading errors tend to occur.

The latter method of using plural CCD sensors makes an entire apparatus for reading large and complicated because a plurality of CCD sensors are needed. It also requires a wide space for reading plural bar codes simultaneously.

The invention is intended to solve these problems, and it is hence a primary object thereof to provide a reading apparatus and reading method capable of automatically reading film information such as bar codes provided in two or more stages on the outer surface of the cartridge by using one sensor, and also saving labor and downsizing the apparatus.

SUMMARY OF THE INVENTION

In a first aspect of the invention, there is provided an apparatus for reading film information provided in plural stages on an outer surface of a cartridge containing a film, comprising:

(a) a light source, (b) a pocket including a main body having a space for containing the cartridge in the main body and a window for exposing the film information of the cartridge contained in the space to outside at a part of an outer surface of the main body; and a support unit for movably supporting the main body in a direction of varying the stages of the film information, (c) an actuator for moving the main body of the pocket, and (d) a reading mechanism for detecting light emitted from the light source, and reflected at an area of the film information through the window.

The support unit is preferred to be a rotary shaft provided at a corner of the main body on the opposite side of the window.

In the first aspect of the invention, there is provided a method for reading film information provided in plural stages on an outer surface of a cartridge containing a film, comprising the steps of:

putting the cartridge into a movably supported pocket, with the film information being exposed to outside, emitting light from a light source toward film information of a certain stage out of the plural stages, reading the film information of the certain stage by detecting the light reflected at an area of the film information of the certain stage by a reading mechanism, moving the cartridge to place film information of a next stage the detecting position of the reading mechanism, and reading the film information of the next stage by detecting the light reflected at an area of the film information of the next stage by the reading mechanism.

In a second aspect of the invention, there is provided an apparatus for reading film information provided in plural stages on an outer surface of a cartridge containing a film, comprising:

(a) a light source, (b) a pocket having a space for containing the cartridge in the pocket, and a window for exposing the film information of the cartridge contained in the space to outside at outside of the pocket, (c) a reading mechanism for detecting light emitted from the light source, and reflected at an area of the film information through the window, and (d) a light guide disposed between the window and reading mechanism, and being rotatably constituted so as to further reflect light and vary an incident angle of the light.

The light guide preferred to comprise a mirror rotatably supported on a rotary shaft, and an actuator for applying an urging force to the mirror so as to rotate the mirror about the rotary shaft.

The light guide is preferred to be an optical fiber disposed between the window and reading mechanism, with the pocket side end portion thereof being movable.

In the second aspect of the invention, there is provided a method for reading film information provided in plural stages on an outer surface of a cartridge containing a film, comprising the steps of:

fixing the cartridge with the film information thereof being exposed to outside, emitting light from a light source toward the film information, reading the film information of a certain stage by detecting the light reflected at an area of the film information of the certain stage, and further reflected at the rotatably supported light guide, by a reading mechanism, rotating the light guide by a predetermined angle to guide the light reflected at an area of the film information of a next stage to the detecting position of the reading mechanism through the light guide, and reading the film information of the next stage by detecting the light reflected at an area of the film information of the next stage by the reading mechanism.

According to the present invention, first of all, in order that all of film information in plural stages can be exposed to outside through the window, the cartridge is put into a main body of pocket capable of moving straight or rotating, and the film information of a certain stage is read by detecting the reflected light from the area of the film information in a certain stage by the reading mechanism through the window. Then, the pocket is moved straight by a certain distance or rotated by a certain angle to place the film information of the next stage to the detecting position, so that the film information of the next stage can be read under the same condition.

When the main body of the pocket is rotatably supported on a rotary shaft and the actuator is designed to rotate the main body of the pocket about the rotary shaft, the desired stage of the film information can be easily placed to the detecting position only by rotating the main body of the pocket by driving the actuator.

Besides, instead of using the pocket having the main body which moves straight or rotates, or instead of the fixed pocket, by using a light guide which is disposed between the window and the reading mechanism, and is rotatably constituted so as to vary the incident angle of the light while further reflecting the reflected light, the film information of plural stages can be read by one reading mechanism.

Moreover, by employing a light guide comprising a mirror rotatably supported on shaft, and an actuator applying an urging force to the mirror so as to rotate the mirror about the rotary shaft, the reflected light from the area of the film information of the desired stage can be easily selected and guided to the detecting position of the reading mechanism only by rotating the mirror by driving of the actuator.

BRIEF DESCRIPTION OF THE DRAWINGS

FIG. 13 is a perspective view of a cartridge having two stages of bar codes provided on an outer surface thereof.

DETAILED DESCRIPTION

Figure 1:
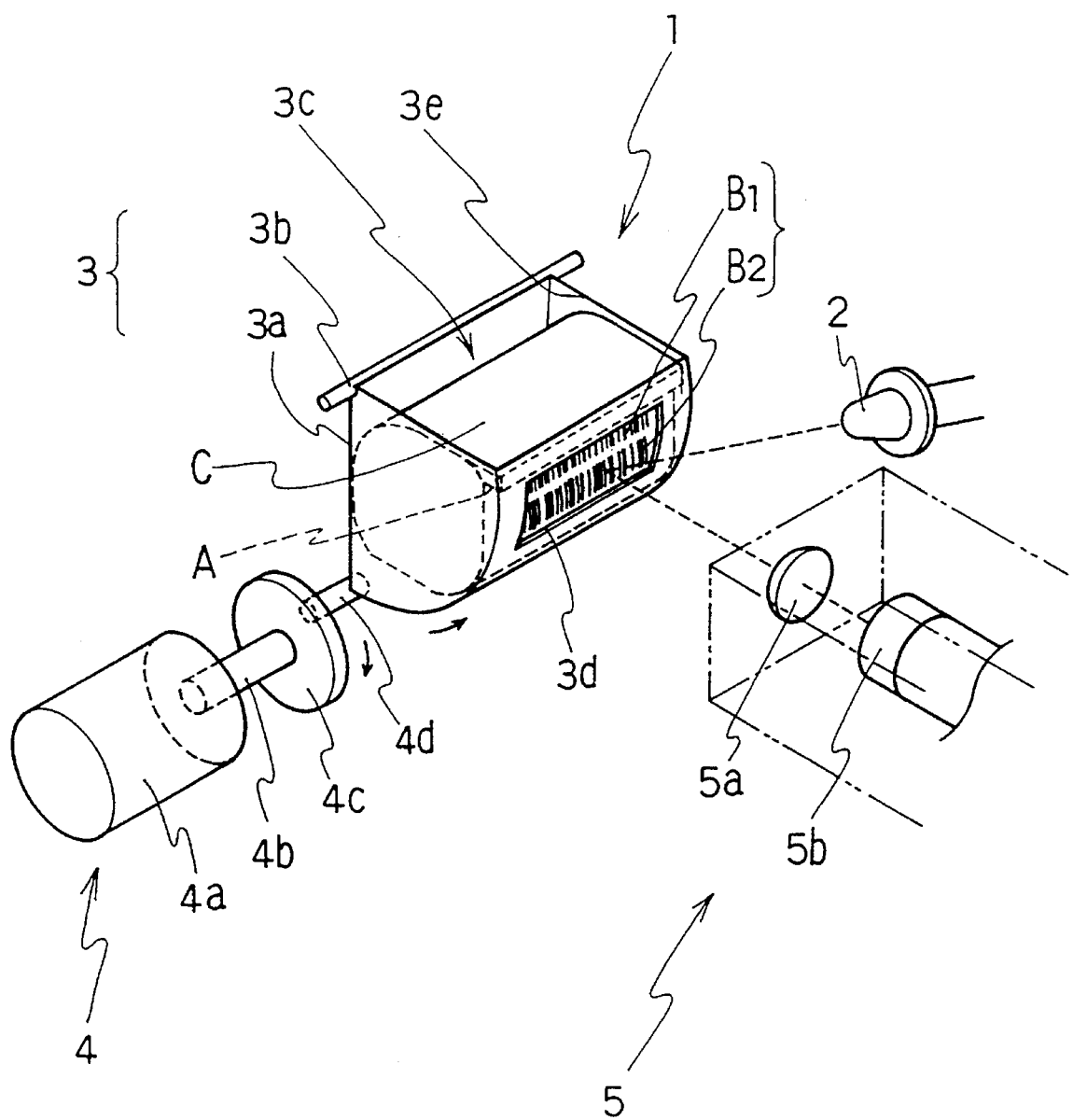
FIG. 1 is a perspective explanatory view showing an embodiment of an apparatus for reading film information for cartridge according to the present invention.

Referring now to the drawings, a reading apparatus and reading method of film information for cartridge according to the present invention are described in detail below.

Figure 2:
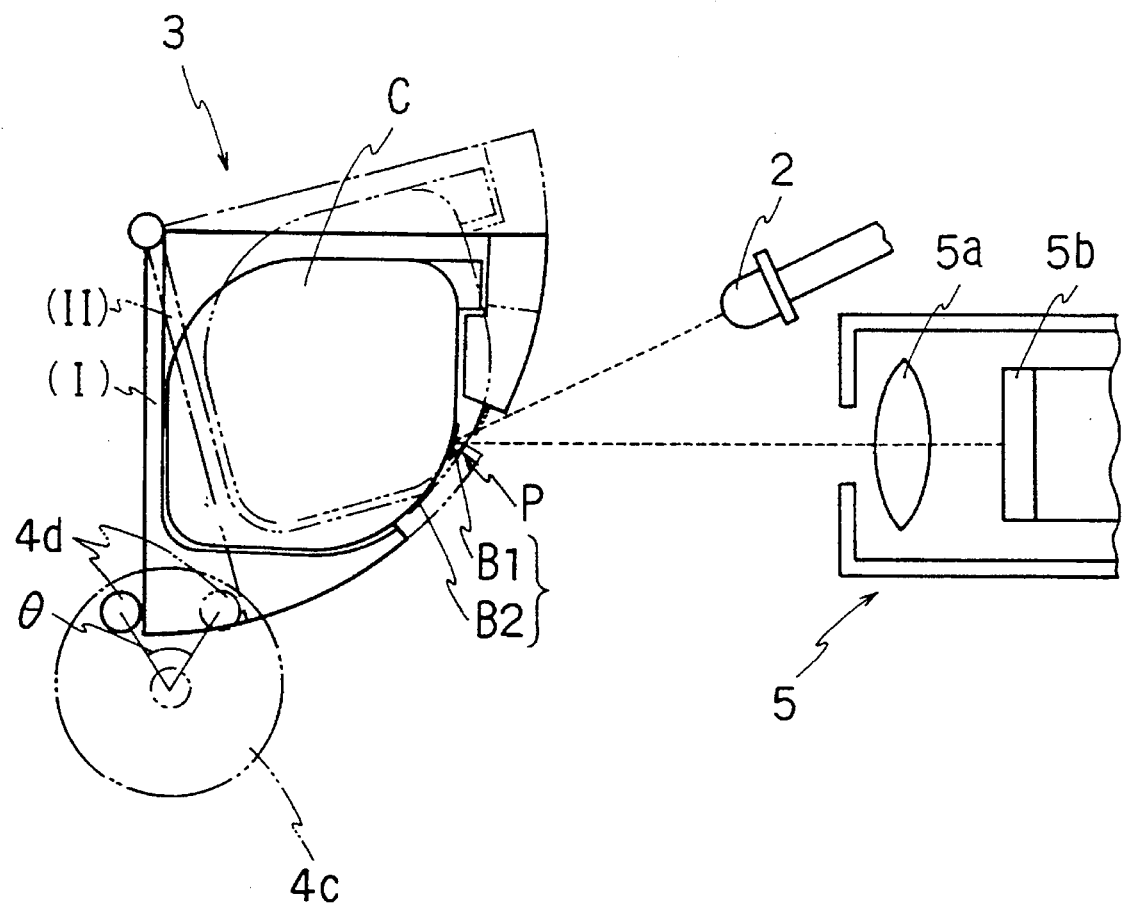
FIG. 2 is a sectional explanatory view of the apparatus for reading information for cartridge of FIG. 1.
Figure 3:
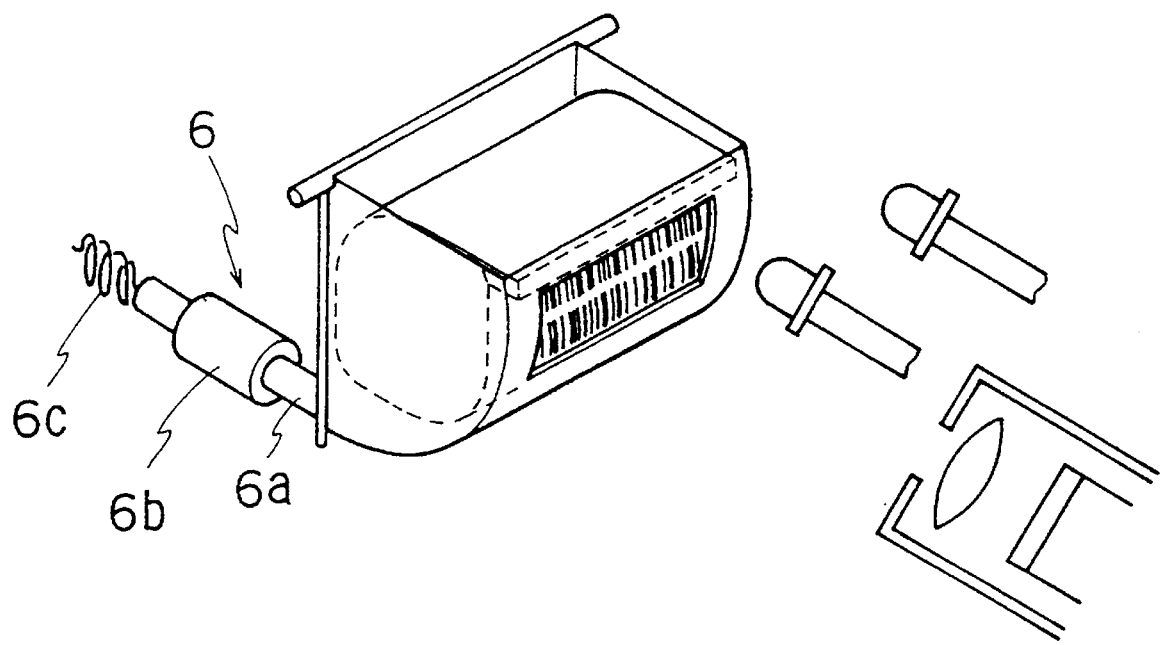
FIG. 3 is a perspective explanatory view showing another embodiment of an apparatus for reading film information for cartridge according to the present invention.
Figure 4:
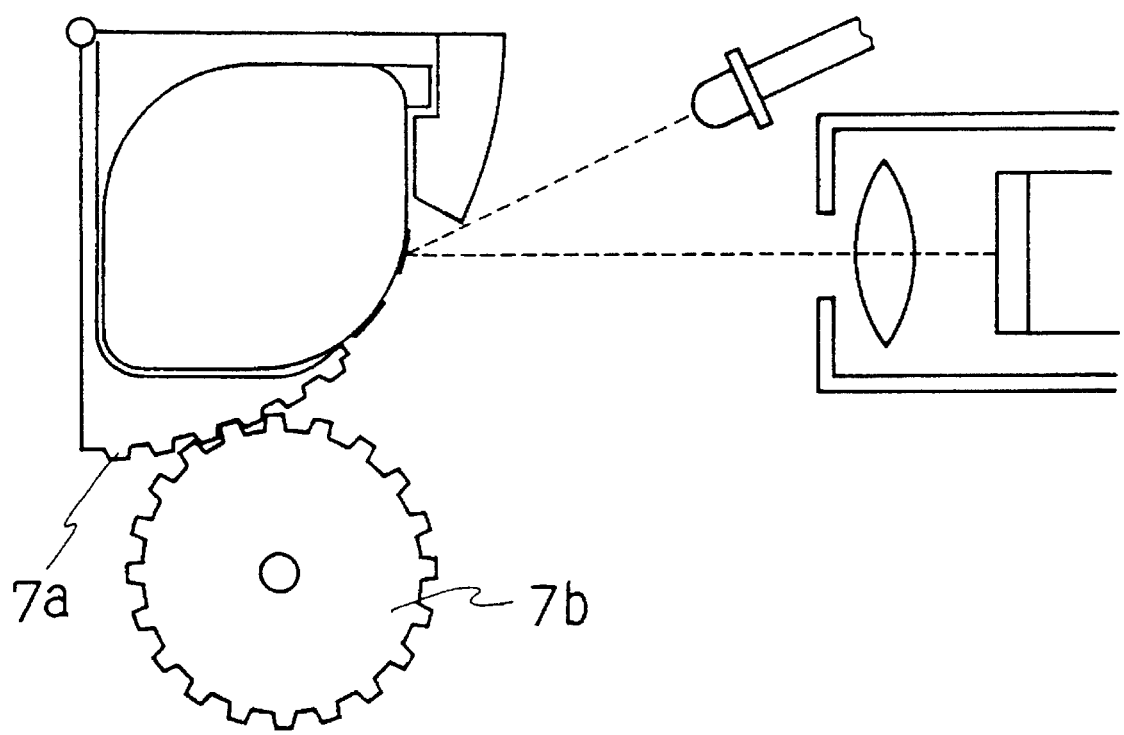
FIG. 4 is a sectional explanatory view showing a further embodiment of an apparatus for reading film information for cartridge according to the present invention.
Figure 5:
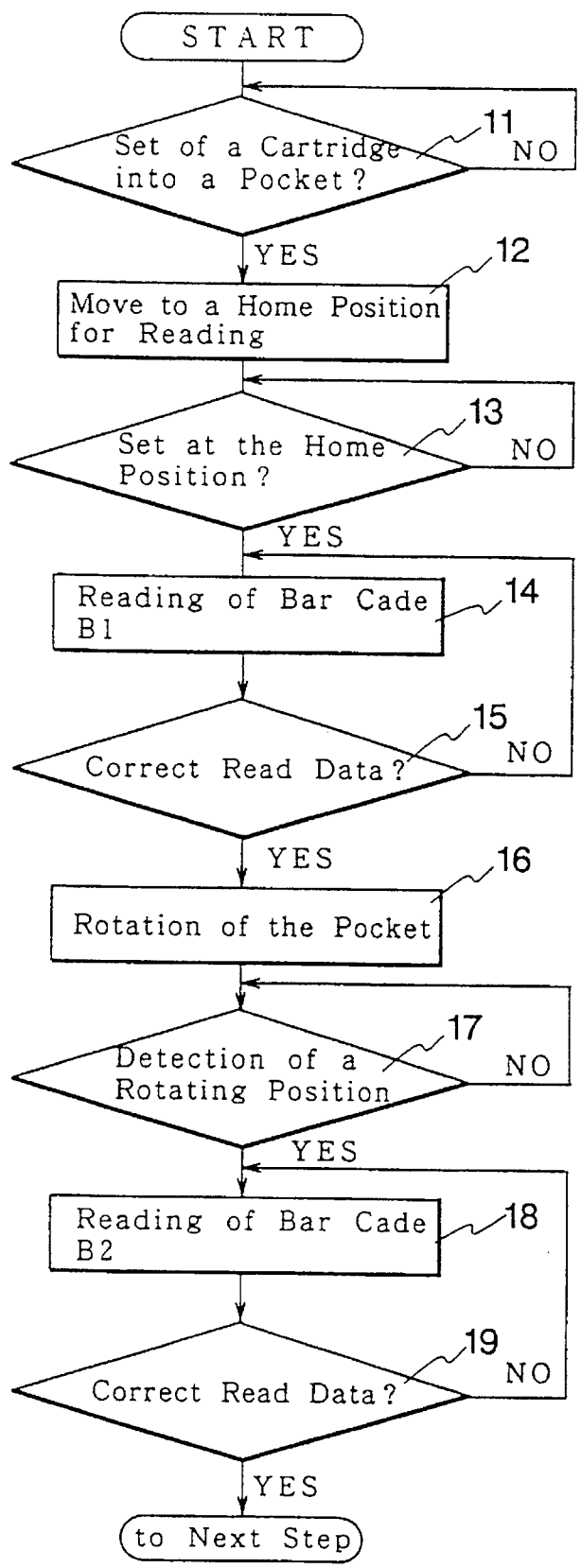
FIG. 5 is a flow chart showing an embodiment of a method for reading film information for cartridge according to the present invention.

FIG. 1 is a perspective explanatory view showing an embodiment of an apparatus for reading film information for cartridge according to the present invention, FIG. 2 is a sectional explanatory view of the apparatus for reading film information for cartridge of FIG. 1, FIG. 3 is a perspective explanatory view showing another embodiment of an apparatus for reading film information for cartridge according to the present invention, FIG. 4 is a sectional explanatory view showing a further embodiment of an apparatus for reading film information for cartridge according to the present invention, and FIG. 5 is a flow chart showing an embodiment of a method for reading film information for cartridge according to the present invention.

A reading apparatus 1 shown in FIG. 1 commprises a light sourse 2 composed of a light emitting device such as LED, a pocket 3 for accommodating a cartridge C, an actuator 4 for moving a main body 3a of the pocket 3, and a reading mechanism 5 for reading the light reflected from either bar code B1 or B2.

The pocket 3 consists of the main body 3a and a rotary shaft 3b which is a support unit for rotatably supporting the main body 3a. The main body 3a has in its inside space 3c formed in a shape substantially complementary to the outside shape of the cartridge C. A window 3d for exposing both bar codes B1 and B2 to outside is formed at the front surface of the main body 3a, and the rotary shaft 3b is coupled to an upper rear edge of the main body 3a. Both ends of the rotary shaft 3b are rotatably supported by bearings or the like provided in the case or the like of the reading apparatus 1. The cartridge C can be put into and out of the space 3c through an opening 3e formed in the upper part of the main body 3a.

In the lower part of a slit (refer to symbol A in FIG. 1) of the cartridge C, for example, when a protrusion is provided, and a corresponding recess is formed inside the main body 3a, the cartridge C can be fixed firmly inside the main body 3a.

Although not shown in the drawing, an opening also formed in the lower part of the main body 3a, and therefore when taking out the cartridge C from the main body 3a of the pocket 3, it can be easily taken out by directly pushing it up with a pin or finger. By turning the pocket 3 upside down, the cartridge C can be also taken out.

The actuator 4 has a pulley 4c fixed on a drive shaft 4b of a rotary solenoid 4a, and a protrusion 4d is provided on the side of the pulley 4c facing the pocket 3 and at a position apart from the drive shaft 4b in the radial direction of the pulley 4c. The actuator 4 is disposed so that the protrusion 4d might press the rear side of the main body 3a of the pocket 3 in an opening angle θ of 20° to 45° (refer to FIG. 2).

As the actuator, instead of the rotary solenoid shown in FIGS. 1 and 2, a push-pull solenoid 6 for pusing and pulling a shaft 6a as shown in FIG. 3 might be also used. In this type of actuator, when a solenoid coil 6b is ON, the shaft 6a is pushed out to push up the main body 3a of the pocket 3. When the solenoid coil 6b is OFF, the shaft 6a is pulled back by a tension coil spring 6c. As a further different example of actuator, as shown in FIG. 4, a rack 7a might be provided in the lower side of the main body 3a of the pocket 3, and an pinion gear 7b engaging the rack 7a might be rotated and driven by a motor or the like. In the case of these actuators, the outside shape of the pocket is suitably varied.

The reading mechanism 5 comprises a convex lens 5a for condensing, and a CCD sensor 5b. The CCD sensor 5b detects the light reflected from either bar code B1 or B2, and converts it into an electric signal. This electric signal is transmitted to a CPU (central processing unit), decoder and others to process the signal, whereby the film information is obtained.

The reading apparatus thus constituted reads the bar code in the following manner.

As shown in FIG. 2, when the cartridge C is at the position indicated by solid line (I), of the light emitted from the light source 2, only the light reflected from the position of the bar code B1 disposed at a detecting position P (home position) is detected by the CCD sensor 5b of the reading mechanism 5. At this time, the light reflected from the position of the bar code B2 is largely shifted off downward from the CCD sensor 5b and is not detected by the CCD sensor 5b. Successively, when the pulley 4c is turned until the protrusion 4d pushes up the main body 3a of the pocket 3, that is, at the position indicated by double dot chain line (II), only the light reflected from the position of bar code B2 is detected by the CCD sensor 5b of the reading mechanism 5. At this time, since the bar code B1 is moved upward, the light reflected from the position of bar code B1 is largely shifted off upward, the light reflected from the position of bar code B1 is largely shifted off upward from the CCD sensor 5, and is not detected by the CCD sensor 5b. In this way, the reflected light from either the bar code B1 or B2 can be selectively detected by the reading mechanism 5.

More specifically, a series of operations for reading film information from the individual bar codes is effected according to the flow chart shown in FIG. 5. The procedure is explained below while referring to FIGS. 1, 2 and 5.

First of all, the cartridge C is loaded into the pocket 3. When loaded, it is judged whether the cartridge C is set in the pocket 3 or not by means of a switch or a reflection type detection sensor provided in the pocket 3 (step 11 ). If No, step 11 is repeated to keep a waiting state. If Yes, go to next step.

By driving the actuator 4, the main body 3a of the pocket 3 is rotated about the rotary shaft, and the bar code B1 is moved to home position p (step 12). In the case of the actuator using push-pull solenoid shown in FIG. 3, the home position P is when the power supply is cut off, that is, when the shaft 6a is most withdrawn from the main body 3a (to the tension coil spring side).

While the bar code B1 is moving, it is judged whether the bar code B1 is set at home position P or not, by means of a bar code reading position detecting sensor (step 13). If No, step 13 is repeated to continue to move. If Yes, go to next step.

Next, driving of the actuator 4 is stopped, and the bar code B1 is read (step 14).

It is then judged whether or not the data read from the bar code B1 is normal by means of CPU (central processing unit) or decoder (step 15). If No, this step is repeated to continue to read the bar code B1. If Yes, go to next step.

Reading of the bar code B1 is stopped, and the main body 3a of the pocket 3 is rotated again (step 16). The rotating position is detected by the bar code reading position detecting sensor or the like, and it is judged whether the predetermined rotating position is reached or not (step 17). If No, step 17 is repeated to continue to rotate. If Yes, go to next step.

Driving of the actuator 4 is stopped, and the bar code B2 is read (step 18).

It is then judged whether or not the data read from the bar code B2 is normal, similarly by means of the CPU or the like (step 19). If No, step 19 is repeated to continue to read the bar code B2. If Yes, detection of all bar codes is over, and the cartridge is taken out of the pocket, and sent to a next step, for example, an ordinary developing process.

In this reading apparatus, the main body of the pocket is rotatably supported on the rotary shaft, and the actuator applies an urging force to the main body of the pocket so that the main body of the pocket might rotate about the rotary shaft. The invention is not, however, limited to this example alone, and any other means might be applied as far as the main body of the pocket is moved straight or rotated substantially in the direction of varying the stage of the film information. For example, in the mechanism in which both ends of the main body of the pocket are supported on two guide rails extending vertically, and the main body of the pocket is moved up and down by driving the actuator, plural bar codes can be sequentially placed at the home position, and the bar codes can be read.

In another embodiment of the reading apparatus of the present invention, instead of the pocket having the main body which moves straight or rotates, a fixed pocket is used, and a light guide is disposed between the window and the reading mechanism the light guide being rotatably constituted so as to further reflect the reflected light and vary the incident angle of the light.

Figure 6:
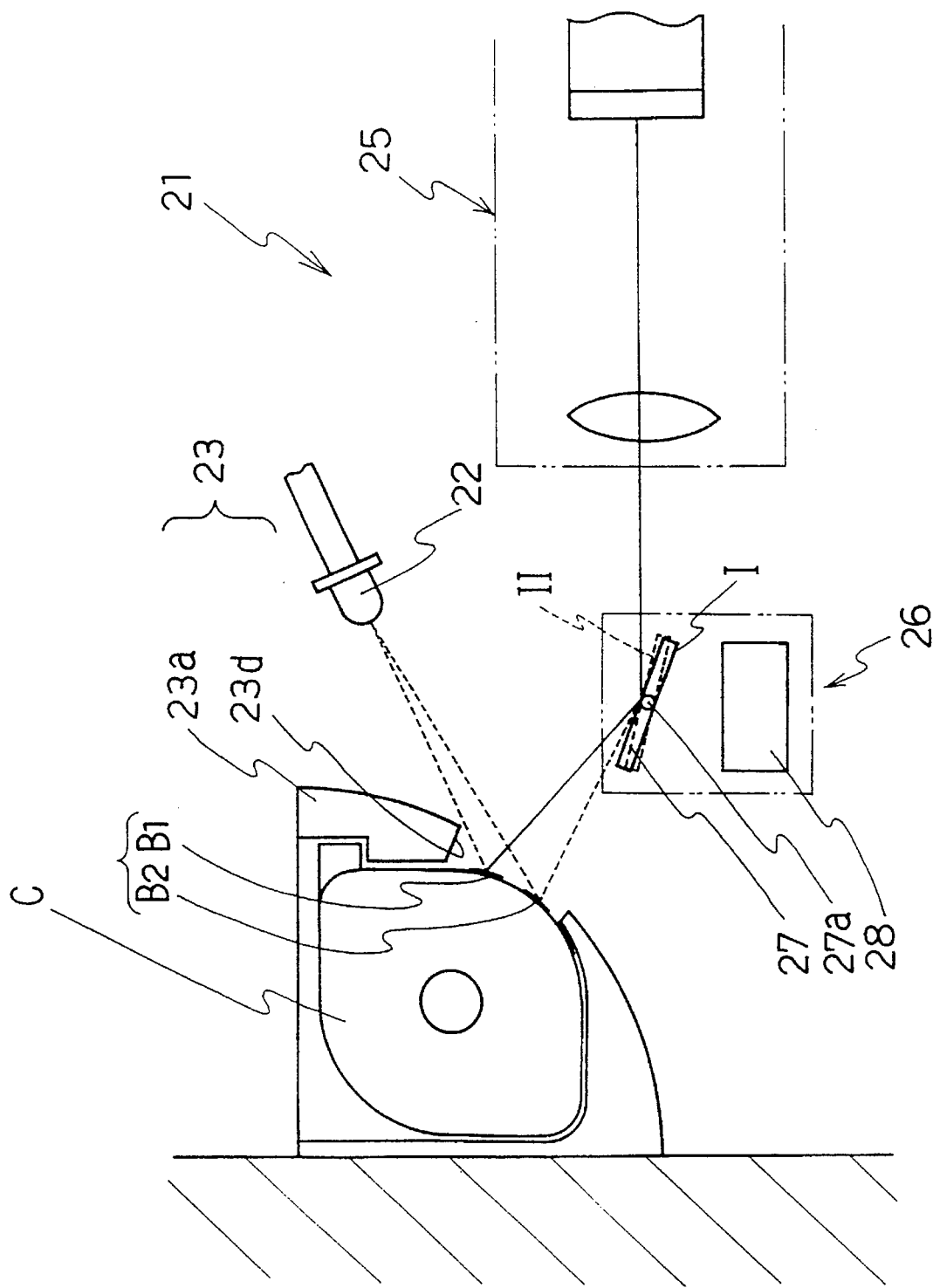
FIG. 6 is a sectional explanatory view showing still another embodiment of a method for reading film information for cartridge according to the present invention.
Figure 7:
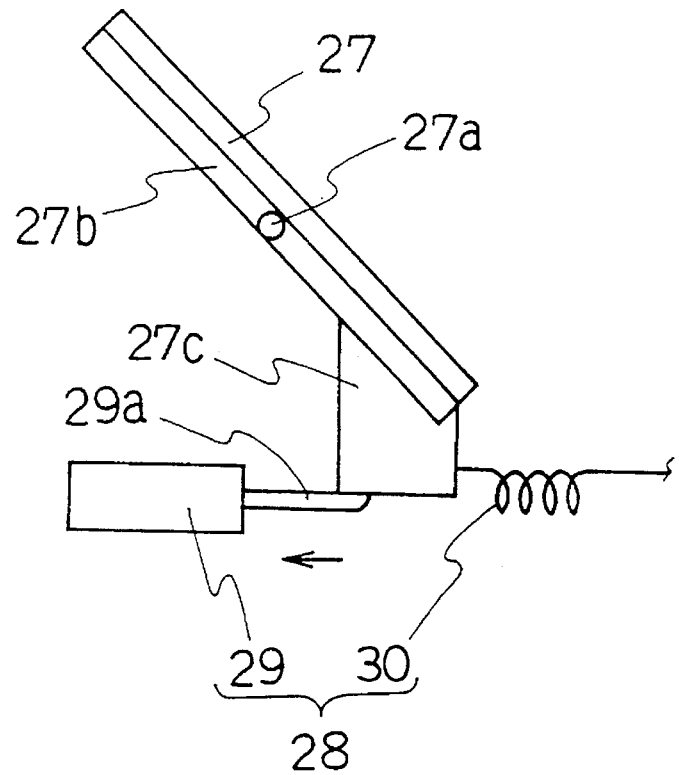
FIG. 7 is a front view showing an example of mirror and actuator used in the apparatus for reading film information of FIG. 6.
Figure 8:
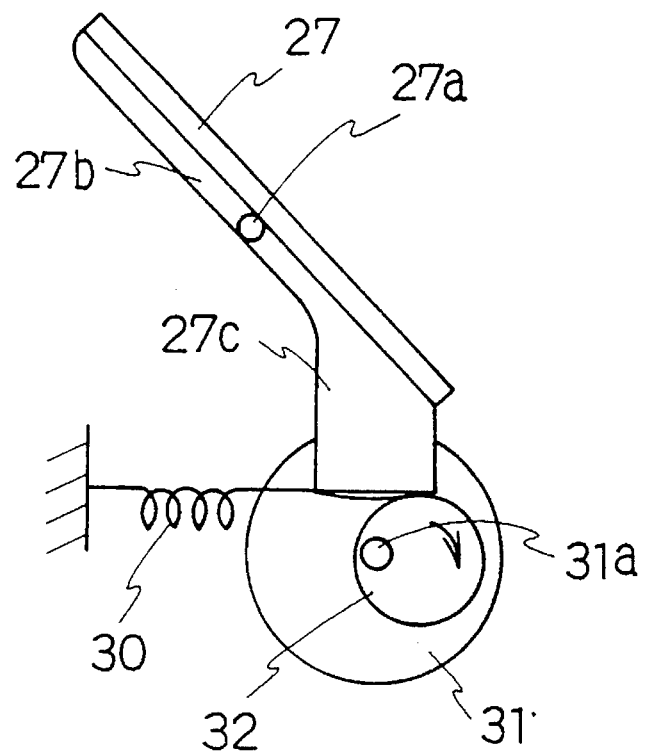
FIG. 8 is a front view showing another example of mirror and actuator used in the apparatus for reading film information of FIG. 6.
Figure 9:
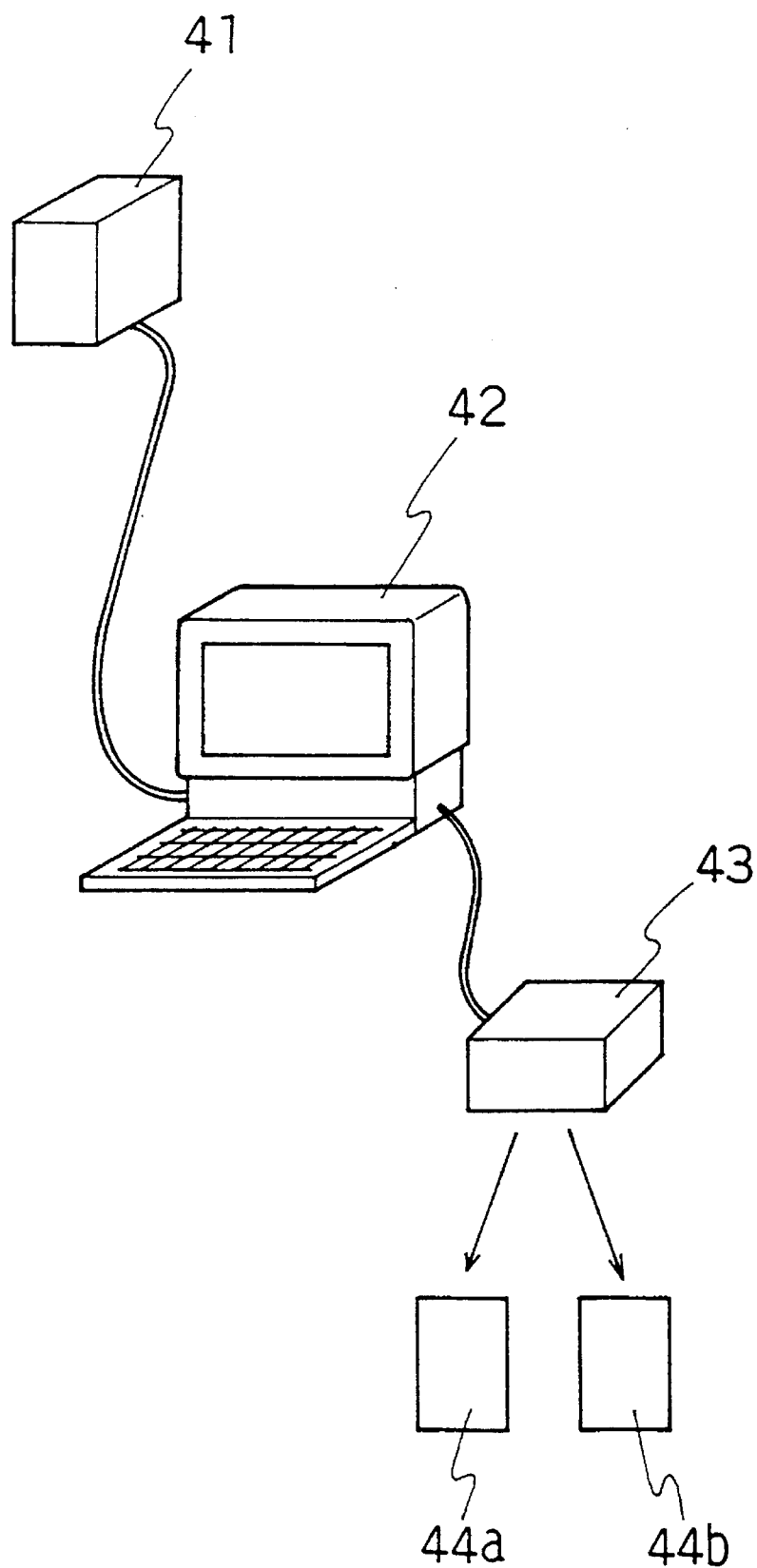
FIG. 9 is a system diagram showing an example of a film exchange ticket issuing system utilizing an apparatus for reading film information for cartridge according to the present invention.
Figure 10:
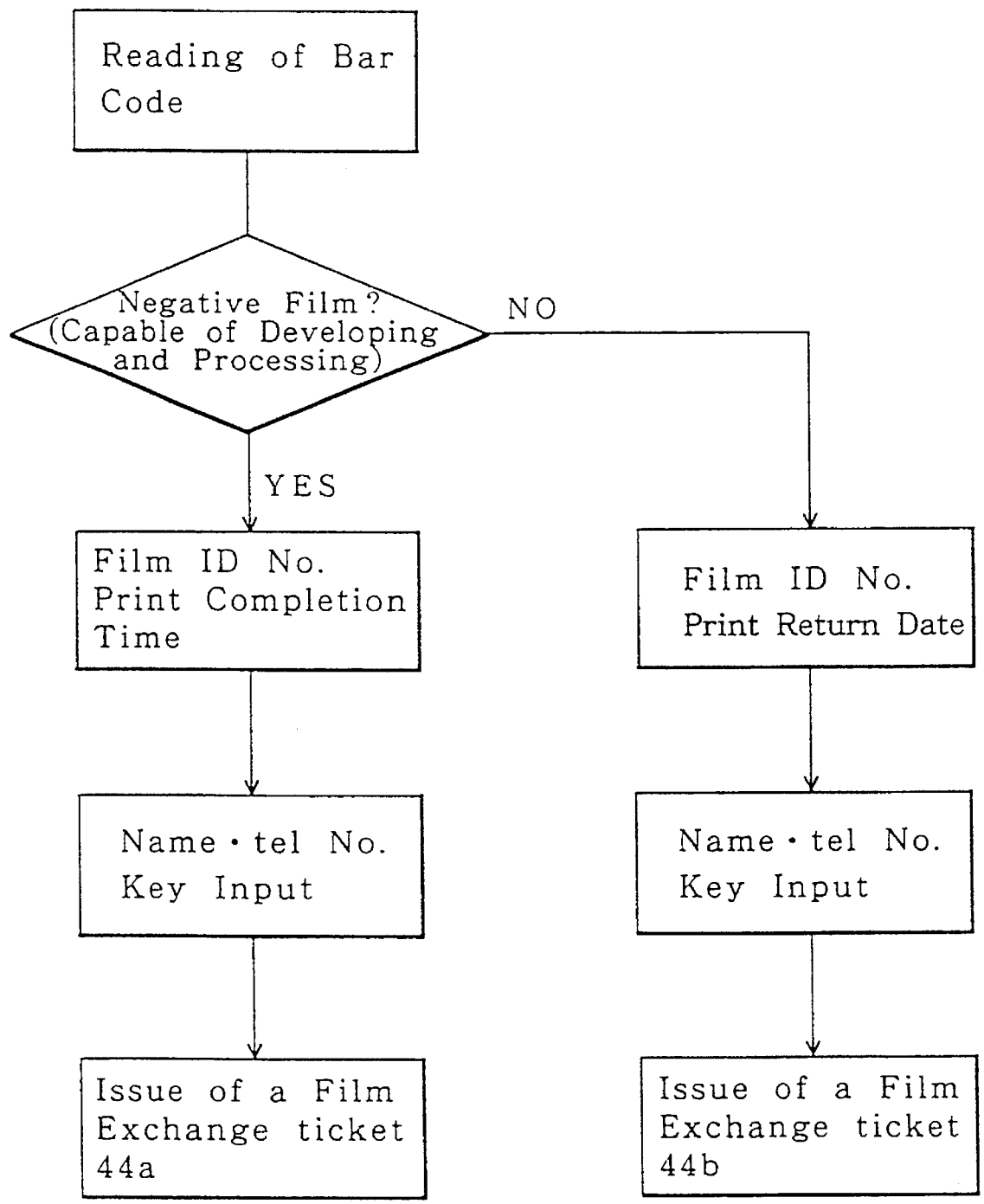
FIG. 10 is a flow chart showing an example of issuing an exchange ticket by using the film exchange ticket issuing system of FIG. 9.

FIG. 6 is a sectional explanatory view showing another embodiment of an apparatus for reading film information for cartridge according to the present invention, FIG. 7 is a front view showing an example of mirror and actuator used in the apparatus for reading film information of FIG. 6, FIG. 8 is a front view showing another example of mirror and actuator used in the apparatus for reading film information of FIG. 6, FIG. 9 is a system diagram showing an example of a film exchange ticket issuing system utilizing an apparatus for reading film information for cartridge according to the present invention, and FIG. 10 is a flow chart showing an example of issuing an exchange ticket by using the film exchange ticket issuing system of FIG. 9.

A reading apparatus 21 shown in FIG. 6 comprises a light source 22 composed of a light emitting device such as LED, a pocket 23 for accommodating a cartridge C, a reading mechanism 25 for detecting the light reflected from either bar code B1 or B2, and a movable light guide 26 for guiding the reflected light from either bar code B1 or B2 to the reading mechanism 25.

The light source 22 and reading mechanism 25 are same as the light source 2 and reading mechanism 5 shown in FIGS. 1 and 2.

The pocket 23 does not have a rotary shaft, and the rear side of the main body 23a is affixed to other part than the main body frame or bar code reading device, which is different from the pocket 3 shown in FIGS. 1 and 2. The other structural features are same as those in the pocket 3.

The light guide 26 comprises, for example, a mirror 27 rotatably supported on a rotary shaft 27a, and an actuator 28 for applying an urging force to the mirror 27 so that the mirror 27 might rotate about the rotary shaft 27a.

The actuator 28 is composed of, for example as shown in FIG. 7, a push-pull solenoid 29 and a tension coil spring 30. More specifically, at the rear side of the mirror 27, a mirror fixing plate 27b having both ends rotatably supported on the rotary shaft 27a is provided, and an arm 27c is provided through the mirror fixing plate 27b. To the lower side of the arm 27c, a shaft 29a of the push-pull solenoid 29 is coupled, and one end of the tension coil spring 30 is coupled to the front side of the arm 27c. The other end of the tension coil spring 30 is coupled to the unmovable position, such as frame. When the push-pull solenoid 29 is ON, the shaft 29a is pulled backward, and the mirror 27 is rotated clockwise by a predetermined angle. When the push-pull solenoid 29 is OFF, the mirror 27 is rotated counterclockwise by the urging force of the tension coil spring 30, and returns to its original position. At this time, the shaft 29a is pulled back forward.

As another example of the actuator 28, as shown in FIG. 8, it might be composed of a tension coil spring 30, a motor 31 such as servo motor for stopping and rotating at an arbitrary rotating angle, and a cam 32 affixed to an eccentric position of the drive shaft 31a of the motor 31. More specifically, one end of the tension coil spring 30 is coupled to the rear side of the arm 27c, and the cam 32 abuts against the lower side of the arm 27c. By driving the motor 31 to rotate, the cam 32 by a certain angle, the arm 27c, mirror fixing plate 27b, and mirror 27 can be rotated by a predetermined angle depending on the displacement of the cam 32 in the vertical direction. By rotating the cam 32 reversely by the motor 31, the mirror 27 can be returned to its original position.

When reading the bar code by using the reading apparatus 21 shown in FIG. 6, by loading the cartridge C into the pocket 23, it is fixed with the bar codes B1 and B2 being exposed to outside through the window 23d. At this time, the mirror 27 is set at first home position I (position indicated by solid line).

Next, the light source 22 emits light. The light reflected at the position of the bar code B1 is further reflected by the mirror 27, and is guided to the reading mechanism 25, and the film information of the bar code B1 is read. At this time, the light reflected at the position of the bar code B2, if reflected by the mirror 27, is not detected because the reading mechanism 25 does not exist on its optical path.

Afterwards, the actuator 28 is driven, and the mirror 27 is rotated couterclockwise about 5° to 10° to be set at second home position II (indicated by broken line).

Similarly, the light reflected at the position of The bar code B2 is reflected by the mirror 27 and is guided to the reading mechanism 25, and the film information of the bar code B2 is read. At this time, the light reflected at the position of the bar code B1 is not detected.

In the preceding reading apparatus, as the light guide, the mirror is rotatably supported on the rotary shaft. The invention is not, however, limited to this example alone, and any other means might be applied as far as the light reflected from the position of certain film information can be selectively guided to the reading mechanism 25. For example, in the mechanism in which the window of the pocket and the reading mechanism 25 are communicated with an optical fiber, and the pocket side end portion of the optical fiber is made movable, the reflected light from plural bar codes can be selectively guided to the reading mechanism 25 to carry out reading of the individual bar codes.

Hitherto, when a photo shop receives a film from a customer for the purpose of developing or the like, the clerk writes down the print delivery time, customer's name and telephone number, and others on the film exchange ticket. This writing job can be automated by making use of the two stages of bar codes and the reading apparatus therefor. The film exchange ticket issuing system is described below.

FIG. 9 is a system diagram showing an example of a film exchange ticket issuing system utilizing an apparatus for reading film information for cartridge according to the present invention. This film exchange ticket issuing system comprises a reading apparatus 41, an input apparatus 42 composed of a personal computer and others for entering the name and telephone number, and a printing apparatus 43 of film exchange ticket. The input apparatus 42 also includes a display device for confirming the input information such as CRT and LCD.

The film exchange ticket issuing system issues the film exchange ticket, for example, as shown in the flow chart in FIG. 10. The issuing method is specifically described below.

First, after reading the bar codes in two stages according to the reading method mentioned above, the type of the film is judged by the CPU or the like in the input apparatus 42.

Figure 11:
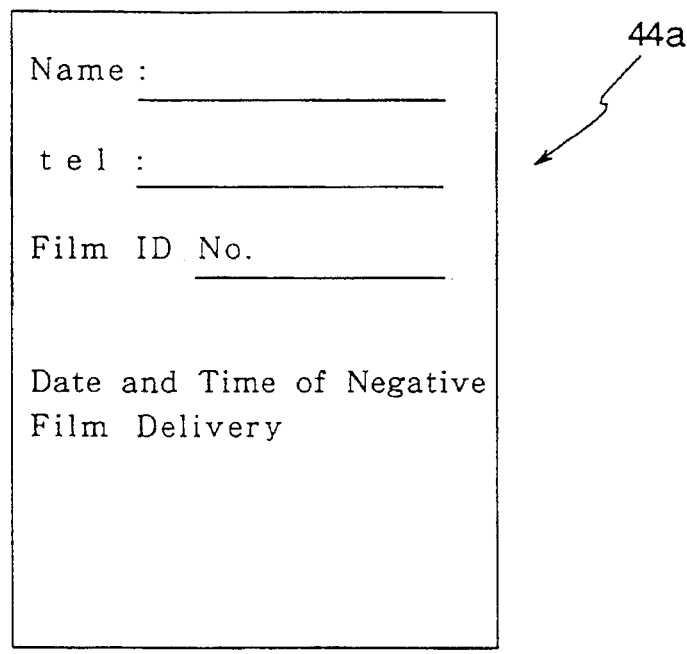
FIG. 11 is an explanatory diagram showing an example of a film exchange ticket issued by using the film exchange ticket issuing system of FIG. 9.

When judged to be a negative film ("Yes" in the diagram), the photo shop can develop the film inside the shop, and therefore prints the film ID number, print completion time (that is, the negative film delivery date), and customer's name and telephone number, and issues a film exchange ticket 44a as shown in FIG. 11. By printing the film ID number, it can be easily collated when returning the film.

If it is judged to be not a negative film ("No" in the diagram), the photo shop cannot develop the film inside the shop, and requests to a developing laboratory, and therefore the print completion time cannot be specified. Therefore, a film exchange ticket 44b printing only the ID number, print return date and customer's name and telephone number is issued. When these two kinds of film exchange tickets 44a, 44b are printed on sheets of different colors, they can be distinguished with each other at a glance, which is more preferable.

Figure 12:
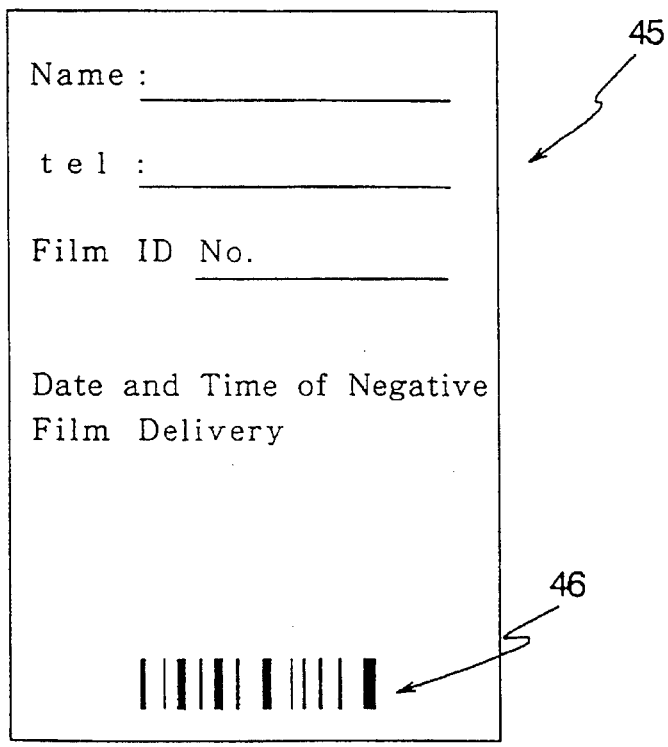
FIG. 12 is an explanatory diagram showing another example of a film exchange ticket issued by using the film exchange ticket issuing system of FIG. 9.

In addition to the above items, when a bar code 46 same as the film ID number is printed on a film exchange ticket 45 (refer to FIG. 12), by reading the bar code 46 when delivering the film, the amount, number of pieces processed, and the number of pieces returned can be easily controlled by a personal computer.

Thus, according to the invention, the film information such as bar codes provided in two or more stages on the outer surface of the cartridge can be automatically read by one sensor, so that labor saving and downsizing of the apparatus can be achieved.

Though several embodiments of the present invention are described above, it is to be understood that the present invention is not limited only to the above-mentioned and various changes and modifications may be made in the invention without departing from the spirit and scope thereof.

What is claimed is:

1. An apparatus for reading film information provided in plural stages on an an outer surface of a cartridge containing a film, comprising:

(a) a light source, (b) a pocket including a main body having a space for containing the cartridge in the main body and a window for exposing the film information of the cartridge contained in the space to outside at a part of an outer surface of the main body; and a support unit for movably supporting the main body in a direction of varying the stages of the film information, (c) an actuator for moving the main body of the pocket, and (d) a reading mechanism for detecting light emitting from the light source, and reflected at an area of the film information through the window.

2. The apparatus of claim 1, wherein the support unit is a rotary shaft provided at a corner of the main body on the opposite side of the window.

3. A method for reading film information provided in plural stages on an outer surface of a cartridge containing a film, comprising the steps of:

putting the cartridge into a movably supported pocket, with the film information being exposed to outside, emitting light from a light source toward film information of a certain stage out of the plural stages, reading the film information of the certain stage by detecting the light reflected at an area of the film information of the certain by a reading mechanism, moving the cartridge to place film information of a next stage to the detecting position of the reading mechanism, and reading the film information of the next stage by detecting the light reflected at an area of the film information of the next stage by the reading mechanism.

4. An apparatus for reading film information provided in plural stages on an outer surface of a cartridge containing a film, comprising:

(a) a light source, (b) a pocket having a space for containing the cartridge in the pocket, and a window for exposing the film information of the cartridge contained in the space to outside at outside of the pocket, (c) a reading mechanism for detecting light emitted from the light source, and reflected at an area of the film information through the window, and (d) a light guide disposed between the window and reading mechanism, and being rotatably constituted so as to further reflect the reflected light and vary an incident angle of the light.

5. The apparatus of claim 4, wherein the light guide comprises a mirror rotatably supported on a rotary shaft, and an actuator for applying an urging force to the mirror so as to rotate the mirror about the rotary shaft.

6. The apparatus of claim 4, wherein the light guide is an optical fiber disposed between the window and reading mechanism, with the pocket side end portion thereof being movable.

7. A method for reading film information provided in plural stages on an outer surface of a cartridge containing a film, comprising the steps of:

fixing the cartridge with the film information being exposed to outside, emitting light from a light source toward the film information, reading the film information of a certain stage by detecting the light reflected at an area of the film information of the certain stage, and further reflected at the rotatably supported light guide, by a reading mechanism, rotating the light guide by a predetermined angle to guide the light reflected at an area of the film information of a next stage to the detecting position of the reading mechanism through the light guide, and reading the film information of the next stage by detecting the light reflected at an area of the film information of the next stage by the reading mechanism.

* * * * *